Patented Dec. 27, 1938

2,141,197

UNITED STATES PATENT OFFICE 2,141,197

COLOR-STABLE OIL-MODIFIED RESIN AND PROCESS OF MAKING SAME

John B. Rust, Orange, N. J., assignor to Ellis-Foster Company, a corporation of New Jersey No Drawing. Application November 27, 1935, Serial No. 51,888. Renewed March 1, 1937

13 Claims.  (Cl. 260—2)

This invention relates to color-stable, oil-soluble phenolic resins and the process of making same, having as a primary object the production of resins capable of giving durable, drier-color-stable, non-discoloring varnishes.

When phenol, i. e., carbolic acid, is reacted to form a resin with formaldehyde, oil-insoluble materials result which may be rendered soluble in drying oils only by fusing with a large excess of rosin or rosin ester. Likewise mixed cresols or cresylic acid-formaldehyde resins, although oil-insoluble under ordinary varnish kettle practice (resin heated with full amount of oil to high temperature), may be rendered oil-soluble not only by fusion with rosin or rosin esters but also by treatment with small amounts of a drying oil.

Phenol when resinified with acetaldehyde produces a dark-colored resin which is, in general, oil-insoluble. However, cresol-acetaldehyde resin is readily oil-soluble but when made in the usual manner with acid condensing agents very dark colored varnishes result. In my copending application, Serial 39,621, I have described phenolic-acetaldehyde resins which are oil-soluble, non-discoloring and practically water white in color, that is, substantially lighter than WW rosin. The process therein described comprises reacting cresols or other phenols preferably with gaseous acetaldehyde in the presence of oxalic acid, or an equivalent compound as catalyst. When first prepared the reaction mixture is dark, but upon heating above 180° C., heat-bleaching takes place and the resin changes from a dark brown to a pale amber color. These resins give very light-colored varnishes which may be used for all coating purposes. They are especially useful in light pigmented enamels. Upon drying to a firm film the freshly prepared varnishes do not yellow, or discolor. This is a valuable feature, since the simple oil-soluble phenol-formaldehyde resins are not film-color-stable but acquire a yellow coloration upon drying. By the term film-color-stable I mean the ability of a varnish to form substantially non-discolored films.

It has been found that phenolic-acetaldehyde resin varnishes made heretofore to which driers have been added, discolor upon storage in either metallic or glass containers. This discoloration is probably due to the formation in the varnish stored in the presence of oxygen of a red, or purple-red dye, the formation of the dye being accelerated in the presence of varnish driers. By the term drier-color-stable varnish I mean a varnish to which driers have been added which does not discolor upon long storage. This term is distinct from the term film-color-stable, which was defined above.

The problem of the present invention, therefore, is to produce a phenolic-acetaldehyde resin, substantially lighter in color than WW rosin, said resin being capable of yielding durable, substantially film- and drier-color-stable varnishes.

I have found that discoloration of varnishes to which driers have been added may be prevented by first substantially completely reacting a phenolic-acetaldehyde resin with drying oils at a low temperature (90°–150° C.) in the presence of a catalyst. Products are obtained which range from soft sticky solids to hard brittle resins, depending upon the amount of drying oil used. The usual practice of modifying resins to make siccative compositions is to heat the resin and oil together to a high temperature. The present process, however, comprises heating the oil and resin in the presence of a catalyst at a relatively low temperature, thus securing a substantially complete reaction between the oil and resin.

Although I may use any drying, or semi-drying oil as the reactive oil component, I prefer to use the more reactive drying oils such as tung, oiticica, perilla and linseed oil. The catalyst may be any acid condensing agent such as hydrochloric, sulphuric, trichloracetic or dichloracetic acid, and preferably having the following characteristics: (a) be readily soluble in the resin, the drying oil, and particularly in the resin-drying oil solutions; (b) be a strong acid catalyst, but not sufficiently strong to gel or char the oil component at the temperatures used; (c) be easily removable by washing or volatilizing from the finished resin-oil reaction product. Oxalic acid fulfils these conditions and has the further advantage, as pointed out in my copending application, Serial 39,621, of yielding phenolic-acetaldehyde resins, which upon heating above 180° C., are heat-bleached, giving products as light in color as WW rosin, or lighter.

The reaction of the oil with the resin is substantially complete when oxalic acid is employed as indicated by rapid thickening of the oxalic acid-catalyzed phenolic-acetaldehyde resin-oil mixture, and increased solubility in petroleum solvents.

The proportion of acid condensing agent may be varied, but I prefer to use not more than 5% based on the total weight of the oil-resin solution. This is in order to secure a better control over the reaction which may proceed too rapidly, resulting in insoluble, infusible gelled masses if a large amount of catalyst is employed.

The reaction products range from soft solids or viscous liquids to hard brittle resins. When more oil than equal parts of oil and resin is used, liquids or soft solids result. If the weight of oil is lower than the weight of resin, brittle resinous materials are obtained. Thus by using 100 to 300% or more of drying oil based on the resin, finished varnishes result and no further treatment is necessary other than thinning with a volatile solvent and adding driers. Such varnishes are light-colored when oxalic acid is employed as catalyst and retain their light color upon storage in either glass or metallic containers. They are film-color-stable and extraordinarily resistant to weathering, water, acids, alkalies, corrosive fumes and other film destroying agents. This good resistance possibly is due to the substantially complete reaction between the oil and resin, a condition which in general does not obtain with phenolic-acetaldehyde resins under ordinary varnish kettle practice.

By using less than 100% of drying oil based on the resin, resinous products result which then may be cooked with additional drying oil in the usual manner to secure varnishes. I have found it inadvisable to use less than 10% drying oil since the resulting phenolic-acetaldehyde varnish resins are not completely drier-color-stable.

Although any oil-soluble phenolic-acetaldehyde resin may be used as the resinous component in this invention, those particularly suited are the phenolic-acetaldehyde-oxalic acid resins described in my copending application, Serial 39,621. These resins, although film-color-stable, are not completely drier-color-stable, but may be rendered so by pretreatment with drying oil in the presence of a catalyst at a relatively low temperature. When phenolic-acetaldehyde resins catalyzed with acids other than oxalic acid or its equivalents are used, the varnishes are not as light in color as those catalyzed with oxalic acid and made with a phenolic-acetaldehyde-oxalic acid resin.

The following are examples illustrative of the process described herein; all proportions are in parts by weight.

*Resin A.*—700 parts of a commercial mixture of meta and para cresol are heated to 100–110° C. with 70 parts of oxalic acid and acetaldehyde gas is passed through the melt for 8 hours at a volume equivalent to 34 parts of acetaldehyde per hour. The dark resin which results is washed with 3000 parts of boiling water then heated to 210–220° C. to dehydrate, harden and bleach. The final resin is hard, brittle, has a softening point of 103° C. and an acid number of 67. It is very pale yellow in color, being substantially lighter than WW rosin.

*Resin B.*—60 parts of a commercial 99% straw-colored cresylic acid, 50% of which distils below 207° C. and 95% below 220° C., are heated with 6 parts of oxalic acid to 110–120° C. and a 50% mixture of illuminating gas and acetaldehyde gas is passed through the mixture for 4 hours. The acetaldehyde gas results from the evaporation of 35 parts of liquid acetaldehyde of boiling range from 20 to 24° C. The resinous product which forms is washed thoroughly with water, then heated to 210–220° C. to dehydrate, harden and bleach. The final resin is hard, brittle and has a color approximately that of WW rosin.

*Resin C.*—54 parts of the cresylic acid used in Resin B are mixed with 85 parts of a 35% aqueous acetaldehyde solution and 40 parts of a 35% aqueous hydrochloric acid solution. The mixture is allowed to stand at room temperature for 72 hours, then the resinous product is washed to remove the hydrochloric acid. The dark-colored resin is heated to 200° C. to dehydrate and harden. It is hard, brittle and very dark in color, resembling pitch or asphalt.

*Example 1.*—40 parts of raw tung oil are mixed with 20 parts of Resin A and 2 parts of oxalic acid and heated at 130° C. for 22 minutes while the mixture is stirred mechanically. The thickened reaction product is then heated to 270° C. over a period of about 10 minutes in order to eliminate the oxalic acid and further increase the viscosity. The varnish base is thinned with 60 parts of VM & P naphtha and 2.1 parts of a 33⅓% lead-cobalt naphthenate drier solution in VM & P naphtha (hereafer referred to in examples as dried solution) are added.

The varnish is light-colored and remains light-colored upon long storage in either glass or metallic containers. It dries to a firm film in about 4 hours, remaining substantially non-discolored.

*Example 2.*—50 parts of Resin B are mixed with 30 parts of raw tung oil and 2 parts of oxalic acid and heated at 135° C. for 1 hour. The thickened reaction product is then heated to 230–240° C. to eliminate the oxalic acid. At room temperature the material is a light-colored, hard, brittle resin.

*Example 3.*—80 parts of Resin A are mixed with 40 parts of raw tung oil and 6 parts of oxalic acid and heated at 130° C. for 2 hours and 25 minutes. The thickened base is then heated to 230–240° C. to remove the oxalic acid. At room temperature the material is a hard, brittle, light-colored resin.

*Example 4.*—80 parts of Resin A are mixed with 40 parts of linseed oil which has been bodied at 300° C. for 2½ hours (hereafter referred to in examples as bodied linseed oil) and 6 parts of oxalic acid and heated to 130° C. for 3 hours and 35 minutes. The temperature is then raised to 230–240° C. to eliminate the oxalic acid and further thicken the melt. The resulting product is a somewhat soft, light-colored resinous material.

*Example 5.*—50 parts of raw tung oil are mixed with 25 parts of Resin A and heated to 120–130° C. While being mechanically stirred 0.1 part of a 35% aqueous hydrochloric acid solution is added and heating continued for 45 minutes. The temperature is then raised to 260° C. to remove the acid. The thickened reaction mixture is thinned with 75 parts of VM & P naphtha and 2.63 parts of drier solution added. The varnish is darker in color than that described in Example 1. However, it dries to a comparatively light-colored film in 4 hours and upon storage does not further discolor.

*Example 6.*—50 parts of raw tung oil are mixed with 25 parts of Resin A and 1.5 parts of dichloracetic acid and heated for 30 minutes at 130° C. The temperature is then raised to 260° C. to remove the dichloracetic acid which volatilizes at 190–200° C. The thickened reaction product is thinned with 75 parts of VM & P naphtha and 2.63 parts of drier solution added. The varnish is darker in color than that described in Example 1. However, upon long storage it does not further discolor.

*Example 7.*—32 parts of the resin described in Example 2 are mixed with 23 parts of raw tung oil and 5 parts of bodied linseed oil and heated at 275° C. for 12 minutes. The varnish base is thinned with 60 parts of CM & P naphtha and 2.1 parts of drier solution added. The resulting varnish is light-colored, film- and drier-color-stable.

Example 8.—30 parts of the resin of Example 3 are mixed with 25 parts of raw tung oil and 5 parts of bodied linseed oil and heated at 270° C. for 10 minutes, then at 250° C. for an additional 10 minutes. The varnish base is thinned with 60 parts of VM & P naphtha and 2.1 parts of drier solution added.

Example 9.—30 parts of the resin described in Example 4 are mixed with 20 parts of raw tung oil and heated at 270° C. for 10 minutes and then at 250° C. for 10 minutes. The varnish base is thinned with 50 parts of CM & P naphtha and 1.75 parts of drier solution added. The varnish remains light-colored upon long storage but due to the comparatively large amount of linseed oil it requires about 8 hours or more to dry.

Example 10.—40 parts of Resin C are mixed with 25 parts of raw tung oil and 2 parts of oxalic acid and heated at 135° C. for 2 hours. The temperature is then raised to 230–240° C. The resin at room temperature is hard, brittle and slightly lighter in color than the original Resin C.

Example 11.—30 parts of the resin described in Example 10 are heated with 18 parts of tung oil and 6 parts of bodied linseed oil at 270–280° C. for 12 minutes. The thickened varnish base is thinned with 54 parts of VM & P naphtha and 1.9 parts of drier solution are added. The varnish is somewhat dark in color but will not further discolor upon storage in metallic or glass containers and dries in 4 hours to a firm film.

In the above examples the varnishes were made with about two parts of oil to one part of resin. However, the amount of oil may be increased or lowered depending upon the use for which the varnish is required and need not be limited by the proportions given in the examples. Furthermore, other oils or mixtures of oils other than those indicated may be used such as perilla, oiticica and soy bean oil, or blown, heat bodied, and catalytically bodied oils can be employed as well as the raw oils. The kind and type of oil used, however, depends upon the properties required of the varnish and uses to which it is to be put.

Two preferred methods therefore are: (1) to heat 1 part of oil-soluble phenolic resin with about 2 parts or more of drying oil to 90°–150° C. in the presence of about 0.06 part of oxalic acid until the mixture has thickened, then eliminate the acid by heating above 220° C., thin with VM & P naphtha and add driers; (2) to heat 3 parts of oil-soluble phenolic resin with about 2 parts of drying oil in the presence of about 0.1 part of oxalic acid at 90°–150° C. until the melt has thickened, then raise the temperature above 200° C. to eliminate oxalic acid. The latter resin may then be cooked with more drying oil to form a varnish.

In the first method a finished drying composition is obtained which may be used as a clear varnish, or incorporated with pigments and dyes for use as an enamel, or paint. Furthermore, driers may be omitted and the siccative base baked to harden and in this form may be spread onto fabrics and cured or hardened with heated rolls.

A hard, brittle, light-colored, film-color-stable, drier-color-stable varnish resin is obtained in the second instance. The resin may be used alone when dissolved in a volatile solvent as a lacquer, or it may be incorporated with cellulose esters to provide a hard, flexible lacquer. However, the resin is particularly adapted for use in drying oil varnishes since it yields siccative compositions which are film- and drier-color-stable. Although this invention relates specifically to phenolic-acetaldehyde resins I may in some cases use other phenolic resins such as phenolic-formaldehyde, and phenolic-ketone resins, or mixtures of phenolic-acetaldehyde resins and phenolic-formaldehyde or phenolic-ketone resins.

I have described the use of reactive unsaturated fatty oils in this invention, but the unsaturated acids derived from unsaturated fatty oils may also be employed and may be subsequently esterified with a monohydric or polyhydric alcohol if desired.

The use of a catalyst is indispensable to the present process. As an example, 1 part of Resin A is heated with 2 parts of raw tung oil at 120° C. for about 30 hours. Little or no thickening of the mixture takes place in this time and the resin precipitates from the oil upon addition of VM & P naphtha. If, however, 0.1 to 0.06 part of oxalic acid is added and the resin-oil mixture heated to 120° C., thickening takes place in about 5 minutes. On the other hand, if 0.1 to 0.06 part of oxalic acid is heated to 120° C. with 2 parts of raw tung oil for 40 hours, little or no thickening takes place, indicating that the catalyst has little or no polymerizing effect upon the tung oil at that temperature.

The varnish reaction products may be thinned with petroleum solvents, such as VM & P naphtha, or the hydrosolvents such as that known to the trade as "Solvesso", or other solvents such as toluol, xylol, turpentine and the like, or mixtures of these solvents. Mineral spirit-soluble driers such as lead and cobalt naphthenates may be employed or the driers may be added directly to the resin-oil reaction product in the form of the salts of lead, cobalt and/or manganese.

The temperatures indicated above for the primary reaction of resin and oil, that is, 90°–150° C., are preferred temperatures. Temperatures higher than 150° C. and lower than 90° C. may be used, but for the most satisfactory results when employing oxalic acid as a catalyst the range from 90° to 150° C. is entirely satisfactory. Temperatures lower than 90° C. necessitate an extremely long heating of the resin-oil mixture in order to bring about reaction when catalytic amounts of oxalic acid are used, and temperatures higher than 150° C. are undesirable since oxalic acid sublimes from the reaction mixture at a rapid rate requiring frequent replenishing of the acid. Temperatures of 110°–140° C. give the smoothest reaction, that is one which proceeds evenly without rapid gelling or local polymerization which results in a lumpy composition. With acids other than oxalic acid, different temperatures may be used as dictated by the characteristics of the acid. Therefore it is understood that when the temperature range of 90°–150° C. is indicated I imply the employment of oxalic acid, or its equivalents, or other acids requiring a different temperature range. The temperatures used in the present invention for primary reaction of a phenolic-acetaldehyde resin with a drying oil in the presence of a catalyst are far below those used in ordinary varnish kettle practice. For instance, if temperatures of 90°-150° C. or even 150°-200° C. were used in the usual varnish kettle practice of making varnishes, extremely long cooking periods would be required and the resulting varnish would, in general, be poor in water, acid, alkali, and weathering resistance. If heated at 150°-200° C. for the same period usually used at regular varnish making temperatures, the varnish would be poor in body and mineral spirit-solubility as well as having relatively no resistance. Furthermore, when made from tung oil the latter varnishes would have a tendency to dry to a frosted or wrinkled surface. Varnish kettle procedure usually demands temperatures of 250° C. and higher.

To recapitulate, the process of the present invention comprises reacting a phenolic-acetaldehyde resin, preferably that described in my copending application, Serial 39,621, with a drying oil at a relatively low temperature, in the presence of an acid condensing agent, to provide siccative compositions or varnish resins capable of yielding light-colored, film- and drier-color-stable varnishes.

In general, the varnishes made by the process of this invention are more durable than varnishes made in the usual manner of varnish making, since a better combination of the oil and resin is secured. In the usual varnish kettle practice thickening of the oil-phenolic-acetaldehye resin mixture to a large degree is due to the polymerization of the drying oil itself. In the present process, however, at the temperatures used little or no polymerization of the drying oil itself takes place, but the thickening results substantially only from the reaction of the resin with the drying oil. Thus the products of the present invention are new and distinct from those resulting from merely heating the resin and oil together in the usual manner. This is clearly indicated from the fact that the varnish compositions of the present invention are drier-color-stable whereas those made by cooking the oil and resin together at a high temperature are drier-color-unstable. If the final products were the same in both instances, the varnishes of the present invention would not be drier-color-stable.

What I claim is:

1. A substantially film- and drier-color-stable varnish composition comprising the reaction product of a phenolic-acetaldehyde-oxalic acid resin and drying oil, formed at 90°-150° C. in the presence of oxalic acid.

2. A reaction product comprising a phenolic-acetaldehyde-oxalic acid resin and tung oil, said reaction product being formed at 90°-150° C. in the presence of oxalic acid.

3. An oxalic acid-catalyzed reaction product of a drying oil and a heat-bleached, oxalic acid-catalyzed phenolic-acetaldehyde resin, said reaction product being formed at 90° to 150° C. and having the property of yielding light-colored, substantially film- and drier-color-stable drying oil varnishes.

4. An oxalic acid-catalyzed reaction product of tung oil and a heat-bleached, oxalic acid-catalyzed cresol-acetaldehyde resin, said reaction product being formed at 90°-150° C. and being capable of forming light-colored, substantially film- and drier-color-stable drying oil varnishes.

5. A process of making a substantially film- and drier-color-stable varnish composition comprising heating one part by weight of an oxalic acid-catalyzed phenolic-acetaldehyde resin with about one part by weight or more of a drying oil at 90°-150° C. in the presence of oxalic acid.

6. Varnish which is substantially identical with that made in accordance to the process of claim 5.

7. A process of making a resinous material comprising heating one part by weight of an oxalic acid-catalyzed phenolic-acetaldehyde resin with less than one part by weight of a drying oil at 90°-150° C. in the presence of oxalic acid, said resinous material being capable of yielding light-colored, substantially film- and drier-color-stable drying oil varnishes.

8. Resinous material substantially identical with the product made in accordance with the process of claim 7.

9. A varnish composition comprising the heat-treated mixture of a drying oil and the resinous material made in accordance with the process of claim 7.

10. A substantially drier-color-stable varnish composition comprising the reaction product of a phenolic-acetaldehyde resin and a drying oil, formed substantially below 200° C. in the presence of an acid condensing agent.

11. A reaction product comprising a phenolic-acetaldehyde resin and a drying oil, said reaction product being formed at temperatures substantially below 200° C. in the presence of an acid condensing agent.

12. A reaction product comprising an oxalic acid-catalyzed phenolic-acetaldehyde resin and a drying oil, said reaction product being formed at temperatures substantially below 200° C. in the presence of an acid condensing agent.

13. An oxalic acid-catalyzed reaction product of tung oil and a heat-bleached, oxalic acid-catalyzed cresylic acid-acetaldehyde resin, said reaction product being formed at 90°-150° C. and being capable of forming light-colored, substantially film- and drier-color-stable drying oil varnishes.

JOHN B. RUST.